United States Patent

Yazawa et al.

(10) Patent No.: US 6,429,780 B1
(45) Date of Patent: Aug. 6, 2002

(54) FAILURE DETECTION METHOD FOR A STEERING WHEEL SENSOR

(75) Inventors: Satoru Yazawa, Hamakita; Naoki Miyashita, Asahi, both of (JP)

(73) Assignee: Nisshinbo Industries, Inc., Tokyo (JP)

( * ) Notice: Subject to any disclaimer, the term of this patent is extended or adjusted under 35 U.S.C. 154(b) by 0 days.

(21) Appl. No.: 09/598,362

(22) Filed: Jun. 21, 2000

(30) Foreign Application Priority Data

Jun. 22, 1999 (JP) ............................................ 11-175477

(51) Int. Cl.⁷ .............................................. G08B 21/00
(52) U.S. Cl. ................. 340/686.3; 340/686.1; 340/438; 702/183; 702/185
(58) Field of Search ...................... 340/686.3, 686.1, 340/686.2, 438, 671, 672; 180/412, 429, 432, 442, 6.28; 701/41, 43; 702/104, 116, 150, 151, 183, 185

(56) References Cited

U.S. PATENT DOCUMENTS

| | | | | |
|---|---|---|---|---|
| 4,860,601 A | * | 8/1989 | Shibata et al. ............. | 73/865.8 |
| 4,970,906 A | * | 11/1990 | Shibata et al. ............. | 73/865.8 |
| 4,999,776 A | * | 3/1991 | Soltis et al. ................ | 180/400 |
| 5,008,823 A | * | 4/1991 | Takahashi .................. | 73/118.1 |
| 5,283,740 A | * | 2/1994 | Sato et al. .................. | 180/400 |
| 5,465,210 A | * | 11/1995 | Walenty ..................... | 180/79.1 |
| 5,732,372 A | * | 3/1998 | Marsden ..................... | 701/41 |
| 5,946,644 A | * | 8/1999 | Cowan et al. .............. | 702/151 |
| 6,089,344 A | * | 7/2000 | Baughn et al. ............. | 180/446 |

* cited by examiner

Primary Examiner—Daniel J. Wu
Assistant Examiner—Toan Pham
(74) Attorney, Agent, or Firm—Arent Fox Kintner Plotkin & Kahn

(57) ABSTRACT

A failure detection method for a steering wheel sensor which includes a center sensor determining a position of a steering wheel center and a steering wheel angle sensor determining a steering wheel angle. A steering wheel center is first determined by the center sensor. The steering wheel angle is determined at said steering wheel center by the steering wheel sensor. A failure of the steering wheel sensor is considered to occur if no steering wheel center is determined by the center sensor when the steering wheel turns 360 degrees from the first determined steering wheel angle.

4 Claims, 2 Drawing Sheets

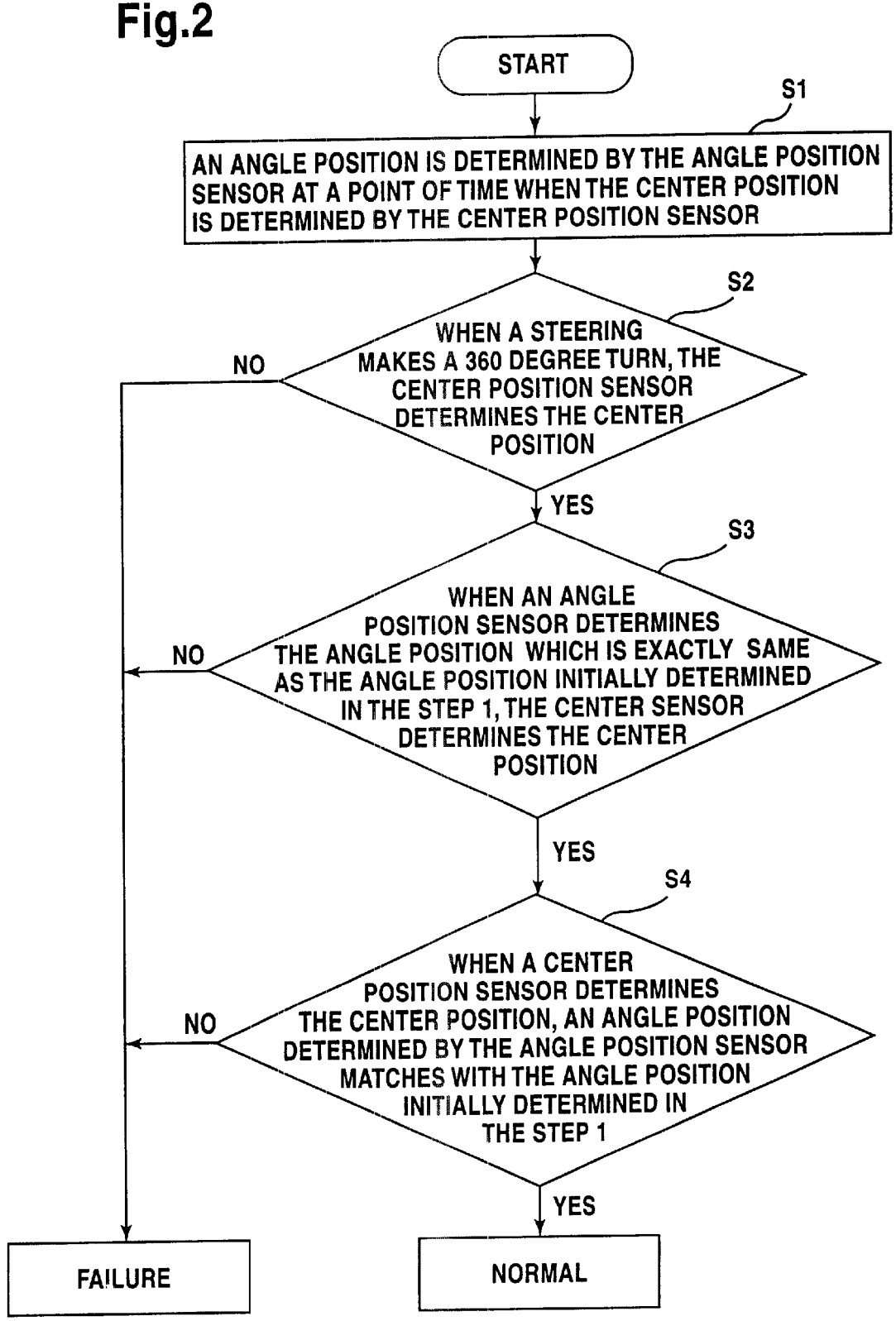

FAILURE DETECTION METHOD FOR A STEERING WHEEL SENSOR

BACKGROUND OF THE INVENTION

This invention relates to a failure detection method for a steering wheel sensor.

Traditionally, in order to detect a failure in a steering wheel sensor, an additional monitoring circuit is built in the steering wheel sensor to detect any deviation which occurs during steering wheel sensor operation. This increases manufacturing cost and introduces another possible point of failure.

OBJECTS AND SUMMARY OF THE INVENTION

It is an object of this invention to provide a failure detection method for a steering wheel sensor.

It is a further object of this invention to provide a failure detection method for a steering wheel sensor which enables detection of a failure in the steering wheel sensor without an additional special device for detecting a steering wheel sensor failure.

This invention is a failure detection method for a steering wheel sensor which includes a steering wheel angle sensor determining a steering wheel angle and a center sensor determining a position of a steering wheel center, which comprises the steps of: determining the steering wheel angle at a point of time when a steering wheel center sensor determines the steering wheel center, and detecting a failure of the steering wheel sensor if no steering wheel center is determined by the center sensor when the steering wheel makes a 360-degree turn.

This invention still further is a failure detection method for a steering wheel sensor which includes a steering wheel angle sensor determining a steering wheel angle and a center sensor determining a position of a steering wheel center, which comprises the steps of: determining the steering wheel angle at a point of time when a steering wheel center sensor determines the steering wheel center, and detecting a failure of the steering wheel sensor if no steering wheel center is determined by the center sensor when the steering wheel angle sensor determines the steering wheel angle which is exactly same as the steering wheel angle previously determined.

This invention still further is a failure detection method for a steering wheel sensor which includes a steering wheel angle sensor determining a steering wheel angle and a center sensor determining a position of a steering wheel center, which comprises the steps of: determining the steering wheel angle at a point of time when a steering wheel center sensor determines the steering wheel center, and detecting a failure of the steering wheel sensor if no steering wheel center is determined by the center sensor either when the steering wheel angle sensor determines the steering wheel angle which is exactly same as the steering wheel angle previously determined or when the steering wheel angle sensor finds every 360-degree turn from the steering wheel angle previously determined.

This invention still further is a failure detection method for a steering wheel sensor which includes a steering wheel angle sensor determining a steering wheel angle and a center sensor determining a position of a steering wheel center, which comprises the steps of: determining the steering wheel angle at a point of time when a steering wheel center sensor determines the steering center, and detecting a failure of the steering wheel sensor if the steering wheel angle determined by the steering wheel angle sensor does not match the steering wheel angle previously determined when the steering wheel center is determined by the steering wheel center sensor.

BRIEF EXPLANATION OF THE DRAWINGS

The above and other objects and the attendant advantages of the present invention will become readily apparent by reference to the following detailed description when considered in conjunction with the accompanying drawings wherein:

FIG. 2 is a flow chart of a failure detection method for a steering wheel sensor setting forth an embodiment of this invention.

DETAILED DESCRIPTION OF PREFERRED EMBODIMENT

Figure 1:
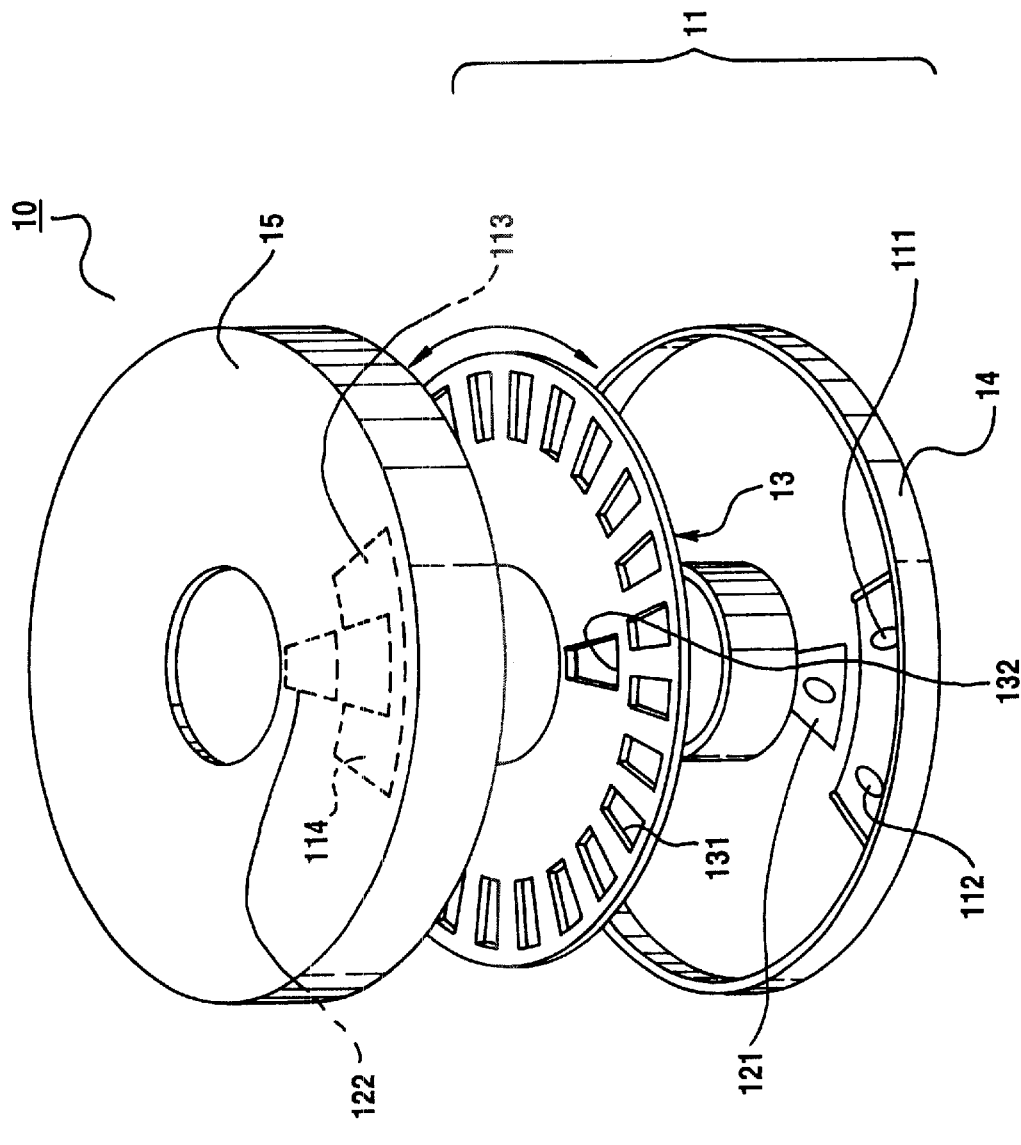
FIG. 1 is an explanation view of the steering wheel sensor.

A failure detection method for a steering wheel sensor is explained next with reference to FIGS. 1 and 2. A steering wheel sensor is a sensor to detect a steering wheel angle of a steering wheel necessary for conducting various different vehicle control operations such as antilock braking control, traction control, and stability control.

As shown in an example of FIG. 1, a steering wheel sensor 10 is a member positioned on a steering wheel shaft and is a publicly known steering wheel sensor comprising of a steering wheel angle sensor 11, a center sensor 12, and a slit plate 13.

The steering wheel angle sensor 11 is a sensor to determine the steering wheel angle of the steering wheel. The center sensor 12 is a sensor to determine a center of a steering wheel. The slit plate 13 is a member installed on a steering wheel shaft and rotates together with that steering wheel shaft. Plural slits 131 are formed in a surface of the slit plate 13 along its periphery (in its peripheral direction) so that the steering wheel angle sensor 11 may determine the steering wheel angle of the steering wheel. A center slit 132 is formed at a position closer to a center of the slit plate 13 than the slit 131 so that the center sensor 12 may determine the center of the steering wheel.

For example, to function as the steering wheel angle sensor 11, light emitting diodes 111, 112 are positioned to face photo couplers 113, 114. The light emitting diodes 111, 112 and the photo couplers 113, 114 are positioned in a pair of cases 14, 15 with certain clearances. Emissions from the light emitting diodes 111, 112 are transmitted through the plural slits 131, which are formed certain clearances along the peripheral direction of the slit plate 13. The steering wheel angle of the steering wheel is determined from a relation between a position determined by the photo couplers 113, 114 and the steering wheel center determined by the later described center sensor 12.

Accordingly, a signal of a certain frequency repeating on and off of the sensor alternatingly is created in the steering wheel angle sensor 11 upon steering wheel rotation.

The center sensor 12 is a sensor to determine a steering wheel center. For example, the center sensor 12 is housed in cases 14, 15 in a manner that the slit plate 13 is placed between the light emitting diode 121 and the photo coupler 122 facing that light emitting diode 121. Emission of the light emitting diode 121 is transmitted through the one center slit 132 opened on the slit plate 13 to determine the position determined by the photo coupler 122 as the steering wheel center.

In the following, stability control (SC) is explained as an example of a vehicle control operation employing a steering wheel sensor.

It may be said that information derived from vehicle behavior and necessary for SC can be an actual yaw rate of a vehicle, a lateral acceleration G, and a steering wheel angle. By operating correlation of such information derived from vehicle behavior, a judgement is made, in which the vehicle is considered to be in an oversteering wheel condition, an understeering wheel condition, or a side skidding condition.

Based upon this judgement of the vehicle condition, an electronic control device within a vehicle brake control device conducts a brake hydraulic circuit control. If the vehicle is judged to be in an understeering wheel condition when turning left, a certain braking force, for example, is applied to a left rear wheel to adjust the vehicle to be in a neutral/stable condition. If the vehicle is judged to be in an oversteering wheel condition when turning left, a certain braking force, for example, is applied to a right front wheel to adjust the vehicle to be in a neutral/stable condition.

One embodiment of a failure detection method for a steering wheel sensor is explained next with reference to FIG. 2.

A steering wheel angle position is determined at a point of time when a steering wheel center is determined by a steering wheel center sensor. (S1)

Then, the steering wheel is turned 360 degrees and the center sensor again determines the steering wheel center. (S2) If, at that stage, no steering wheel center is determined, the steering wheel sensor is determined to be faulty.

If the steering wheel center is determined by the center sensor when the steering wheel is turned 360 degrees, a further check is made. When the steering wheel angle sensor again determines the steering wheel angle which is exactly same as the steering wheel angle previously determined, the center sensor again determines the steering wheel center. If, at that stage, no steering wheel center is determined, the steering wheel sensor is determined to be faulty. (S3)

Further, when the steering wheel angle sensor determines that a 360-degree turn from the steering wheel angle previously determined, the center sensor again determines the steering wheel center. If, at that stage, no steering wheel center is determined, the steering wheel sensor is determined to be faulty. (S3).

Here, by determining the steering wheel center when the steering wheel angle position makes a complete 360-degree turn as one unit, determining the steering wheel center can be checked even if the steering wheel makes more than one turn.

A third check is made by having the steering wheel center determined. Then, the steering wheel angle determined by the steering wheel angle sensor is determined to be positioned exactly same as the angle determined at a time when the previous steering wheel center was determined. At that time, if the center sensor determines the steering wheel center, the steering wheel sensor is considered normal. This check of the steering wheel angle matching the angle previously determined by the steering wheel angle sensor at the time the center sensor previously determined the steering wheel center checks the angle sensor itself. (S4)

If the steering wheel angle does not match with the steering wheel angle previously determined when the steering wheel center was determined, the steering wheel sensor is judged to be faulty.

If the steering wheel angle sensor does match with the steering wheel angle previously determined when the steering wheel center is determined by the center sensor, the steering wheel sensor is judged to be normal.

This invention as described above has the following advantages:

It is possible to detect a steering wheel sensor failure; and

It is economical since there is no need for an additional circuit for steering wheel sensor failure detection.

It is readily apparent that the above-described has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A failure detection method for a steering wheel sensor which includes a steering wheel angle sensor determining a steering wheel angle and a center sensor determining a position of a steering wheel center, which comprises the steps of:

(a) determining said steering wheel angle at a point of time when a steering wheel center sensor determines said steering wheel center, and (b) detecting a failure of said steering wheel sensor if no steering wheel center is determined by said center sensor when said steering wheel makes a 360-degree turn.

2. A failure detection method for a steering wheel sensor which includes a steering wheel angle sensor determining a steering wheel angle and a center sensor determining a position of a steering wheel center, which comprises the steps of:

(a) determining said steering wheel angle at a point of time when a steering wheel center sensor determines said steering wheel center, and (b) detecting a failure of said steering wheel sensor if no steering wheel center is determined by said center sensor when said steering wheel angle sensor determines the steering wheel angle which is exactly same as the steering wheel angle previously determined in step (a).

3. A failure detection method for a steering wheel sensor which includes a steering wheel angle sensor determining a steering wheel angle and a center sensor determining a position of a steering wheel center, which comprises the steps of:

(a) determining said steering wheel angle at a point of time when a steering wheel center sensor determines said steering wheel center, and (b) detecting a failure of said steering wheel sensor if no steering wheel center is determined by said center sensor either when said steering wheel angle sensor determines the steering wheel angle which is exactly same as the steering wheel angle previously determined in step (a) or when said steering wheel angle sensor determines a 360-degree turn from said steering wheel angle previously determined in step (a).

4. A failure detection method for a steering wheel sensor which includes a steering wheel angle sensor determining a steering wheel angle and a center sensor determining a position of a steering wheel center, which comprises the steps of
   (a) determining said steering wheel angle at a point of time when a steering wheel center sensor determines said steering wheel center, and
   (b) detecting a failure of said steering wheel sensor if said steering wheel angle determined by said steering wheel angle sensor does not match said steering wheel angle previously determined in step (a) when said steering wheel center is determined by said steering wheel center sensor.

* * * * *